Figure 1:
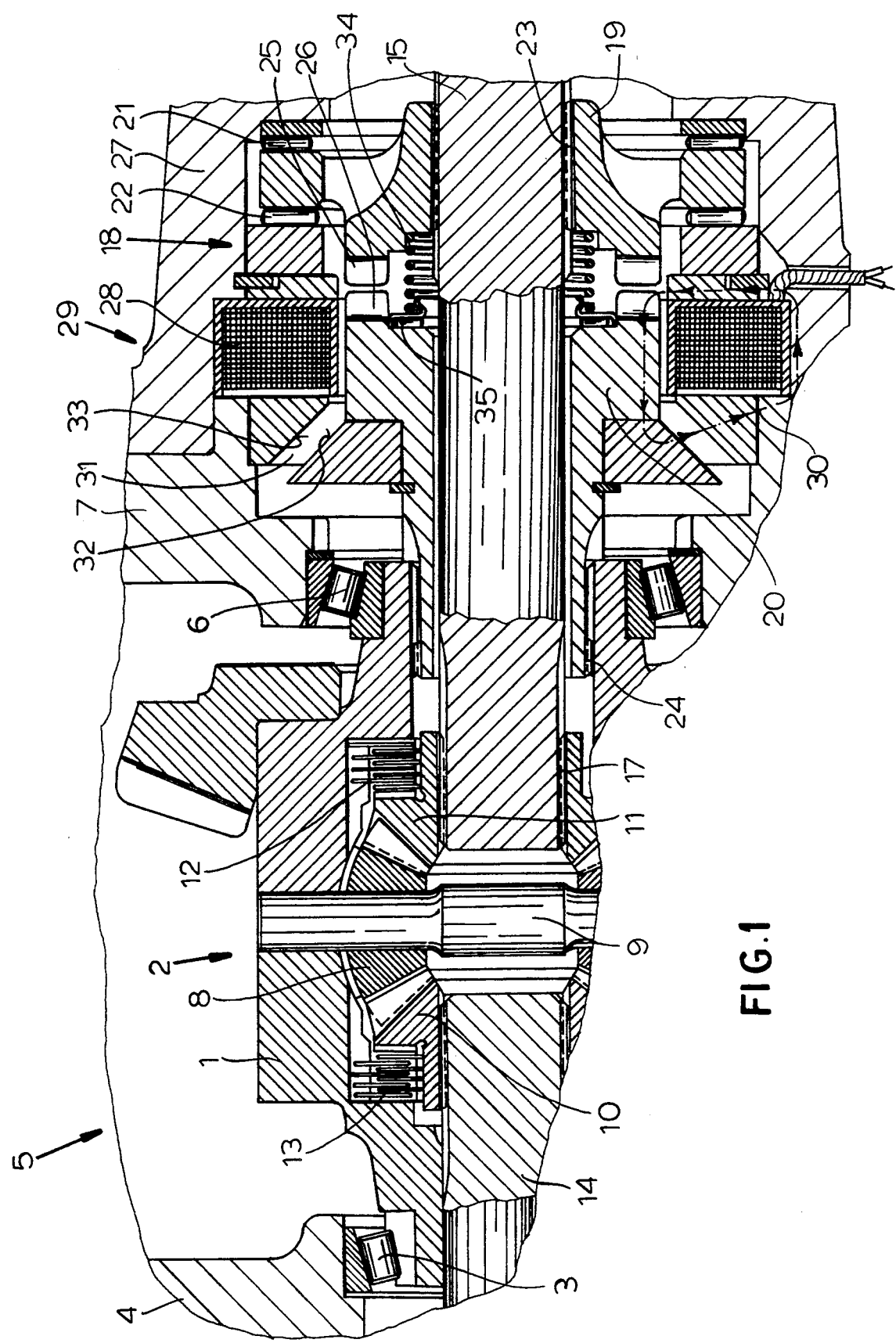

United States Patent [19]

Paul et al.

[11] Patent Number: 5,350,340
[45] Date of Patent: Sep. 27, 1994

[54] LOCKABLE DIFFERENTIAL GEAR

[75] Inventors: Michael Paul, Passau; Eberhard Wilks, Hutthurm; Peter Sigl, Pocking, all of Fed. Rep. of Germany

[73] Assignee: ZF Friedrichshafen AG, Friedrichshafen, Fed. Rep. of Germany

[21] Appl. No.: 671,768

[22] PCT Filed: Sep. 30, 1989

[86] PCT No.: PCT/EP89/01151

§ 371 Date: Mar. 27, 1991

§ 102(e) Date: Mar. 27, 1991

[87] PCT Pub. No.: WO90/04118

PCT Pub. Date: Apr. 19, 1990

[30] Foreign Application Priority Data

Oct. 5, 1988 [DE] Fed. Rep. of Germany ....... 3833785

[51] Int. Cl.⁵ .............................................. F16H 1/445
[52] U.S. Cl. ..................................... 475/237; 475/238; 475/231
[58] Field of Search ................ 475/231, 237, 238, 239

[56] References Cited

U.S. PATENT DOCUMENTS

| 2,017,577 | 10/1935 | Adams | 475/237 |
| 4,113,044 | 9/1978 | Williams et al. | 180/51 |

FOREIGN PATENT DOCUMENTS

| 1930668 | 1/1970 | Fed. Rep. of Germany . |
| 1948616 | 4/1971 | Fed. Rep. of Germany . |
| 3617074 | 11/1987 | Fed. Rep. of Germany . |
| 3808066 | 9/1988 | Fed. Rep. of Germany . |
| 1338200 | 12/1963 | France . |
| 1224034 | 3/1971 | United Kingdom . |
| 8808383 | 11/1988 | World Int. Prop. O. . |

Primary Examiner—Dirk Wright
Attorney, Agent, or Firm—Herbert Dubno

[57] ABSTRACT

In a differential, a clutch links an axially stationary planet carrier with an axially mobile output shaft so that they rotate together. Engaging gears with engaging surfaces parallel to the main axis link an axially stationary clutch part with the output shaft so that they rotate together. Engaging gears with engaging surfaces parallel to the main axis link an axially mobile clutch part with the planet carrier so that they rotate together.

5 Claims, 4 Drawing Sheets

LOCKABLE DIFFERENTIAL GEAR

The invention relates to a differential gear having these features:
An axially stationary planet carrier drives two center gears over at least one planetary gear,
each central gear drives an axially mobile output shaft,
at least one actuatable clutch with an axially stationary and an axially mobile clutch component connects the planet carrier with an output shaft.
the mobile clutch component is corotatably connected with the planet carrier,
the stationary clutch component is corotatably connected with the output shaft,
a gear housing has an intermediate ring part between a first and a second main component,
the planet carrier is supported by a first bearing in the first main component and by a second bearing in the intermediate ring part.

A differential of this kind is mostly used as a transversal differential between the drive wheels of a drive axle and as a longitudinal differential between the two drive axles of a vehicle. The clutch has to prevent the skidding of a drive wheel on slippery ground.

When external forces, for instance of a universal joint between the output shaft and a steered drive wheel of the vehicle axially move the output shaft under full load, the axially parallel engaging surfaces of the engaging gears of the output shaft transmit high axial forces through friction from the output shaft to the axially mobile clutch component. In order to avoid these undesirable axial friction forces, in a known arrangement (DE-A-38 08 066, FIGS. 2 ad 3) the axially mobile clutch component is supported in the planet carrier by means of an engaging gear. The thereto pertaining actuation device for the clutch is a part of the differential gear. The axially stationary clutch component which corotatably connected with the output shaft, is at the same time the inner disk carrier of a friction clutch. Axial friction forces can here act upon the friction disks and/or the bearing of the differential gear.

In the differential gear with differential lock according to U.S. Pat. No. 2,017,577, the axially stationary clutch component is supported in the axle housing by means of a radial ball bearing. This ball bearing is not suitable for bracing against axial forces.

It is the object of the invention to create a differential gear of the aforedescribed kind, wherein the axially mobile clutch component and the axially stationary clutch component are arranged so that disturbing influences originating from axial friction forces are excluded.

According to the invention, this problem is solved due to the fact that the stationary clutch component is held by two axial bearing axially fixed with respect to the second main component. This solution insures that the axially mobile as well as the axially stationary clutch component are both free from axial friction forces, so that disturbing influences on one of the friction clutches of the differential gear, respectively the continuously controllable friction clutch for the connection of the planet carrier with the output shaft are precluded.

A differential gear according to claims 2 and claim 3 can be controlled and adjusted so that it makes possible a free engine speed compensation (with minimal friction torque) as well as an actuation with full engine output over a single drive wheel (with maximum friction torque).

With the features according to claim 4 an actuatable clutch can be built as a friction clutch with small dimensions, while the brakes are actuated as steering brakes, only thereby already preventing the skidding of a drive wheel.

With the features according to claim 5, it is enough to provide a single brake for at least two drive wheels, because the clutch transmits a braking torque of the brake to both output shafts of the differential gear.

The drawing shows preferred embodiment examples of the invention.

Figure 2:
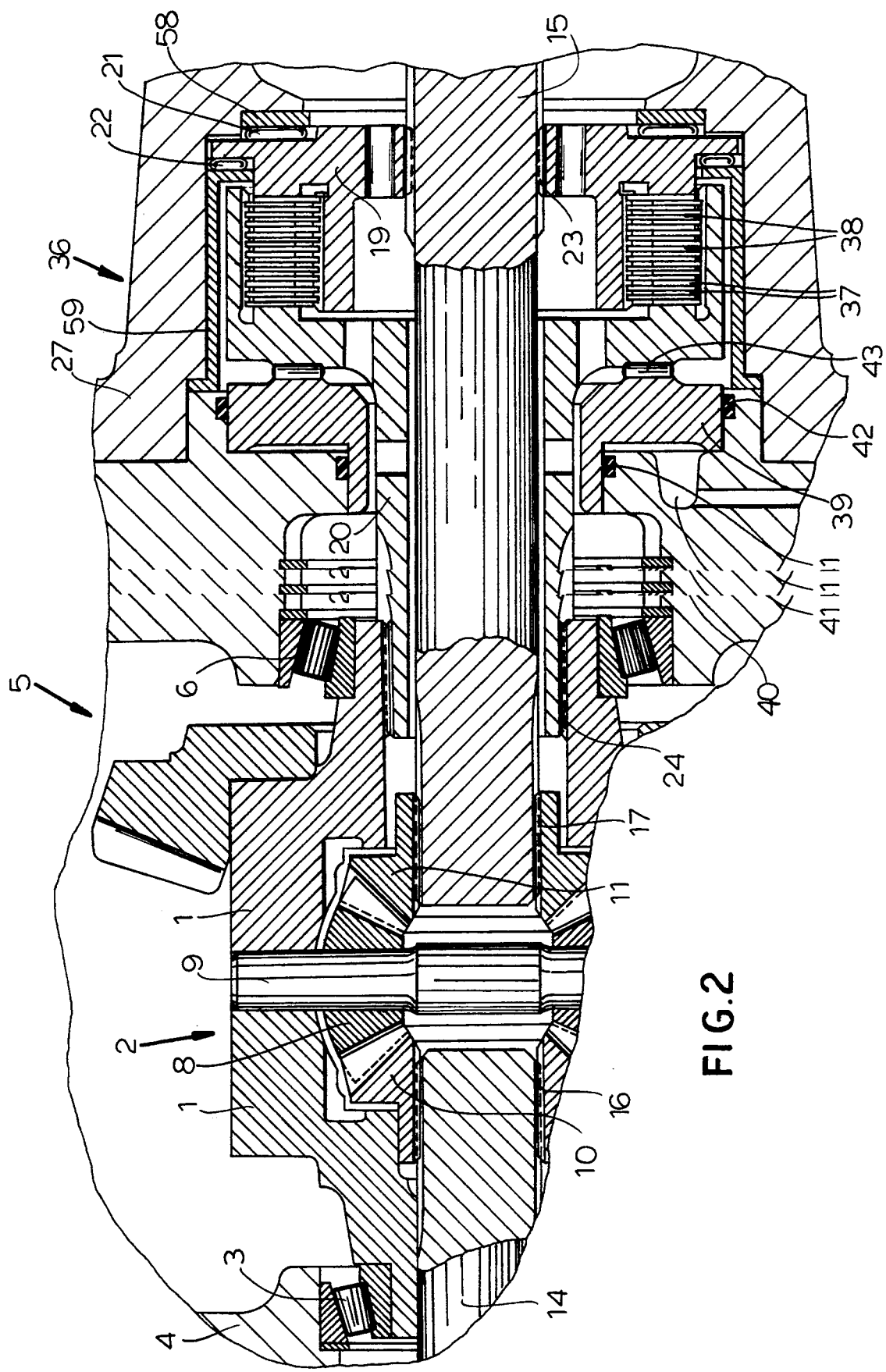
Figure 3:
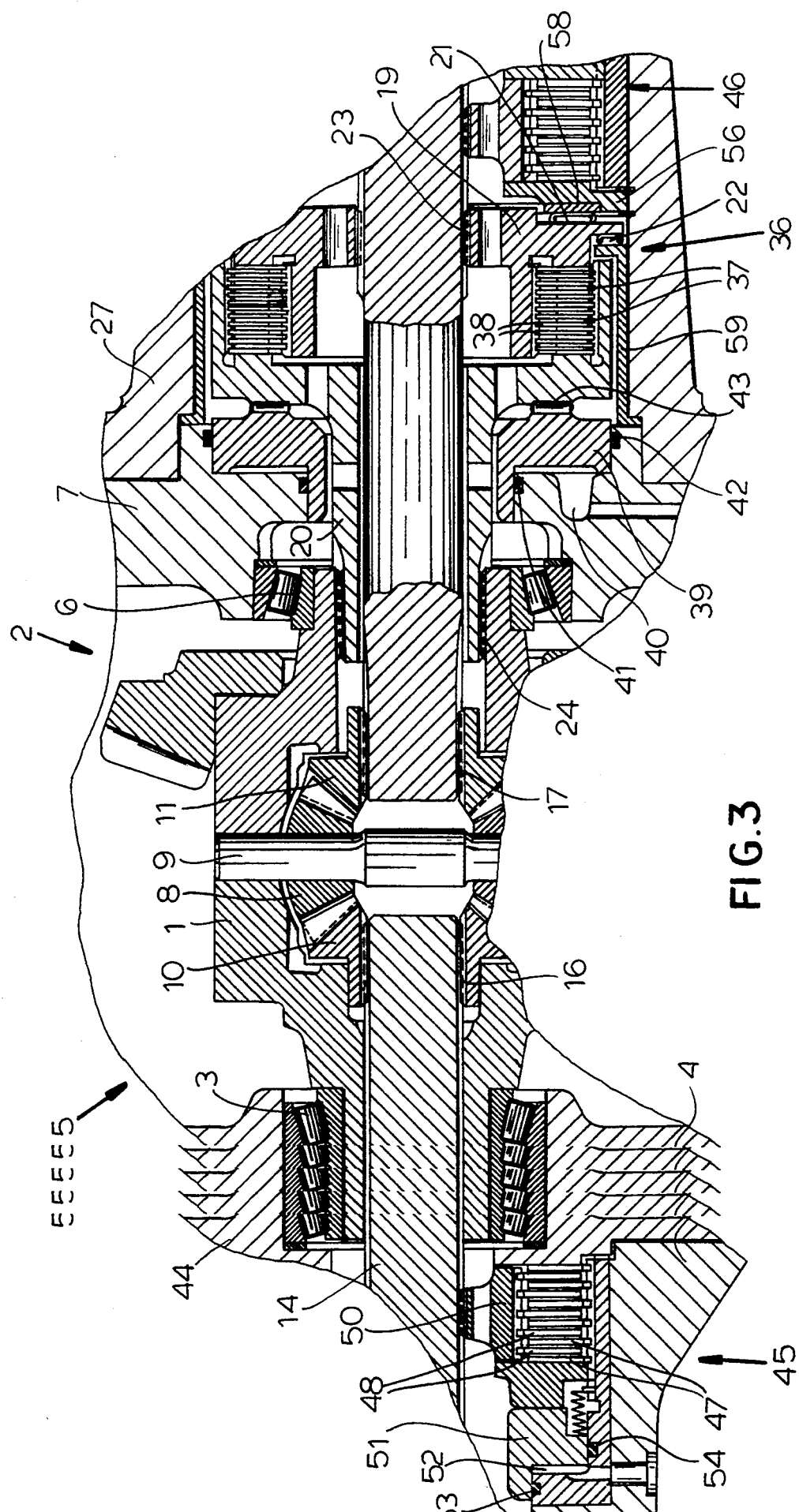
Figure 4:
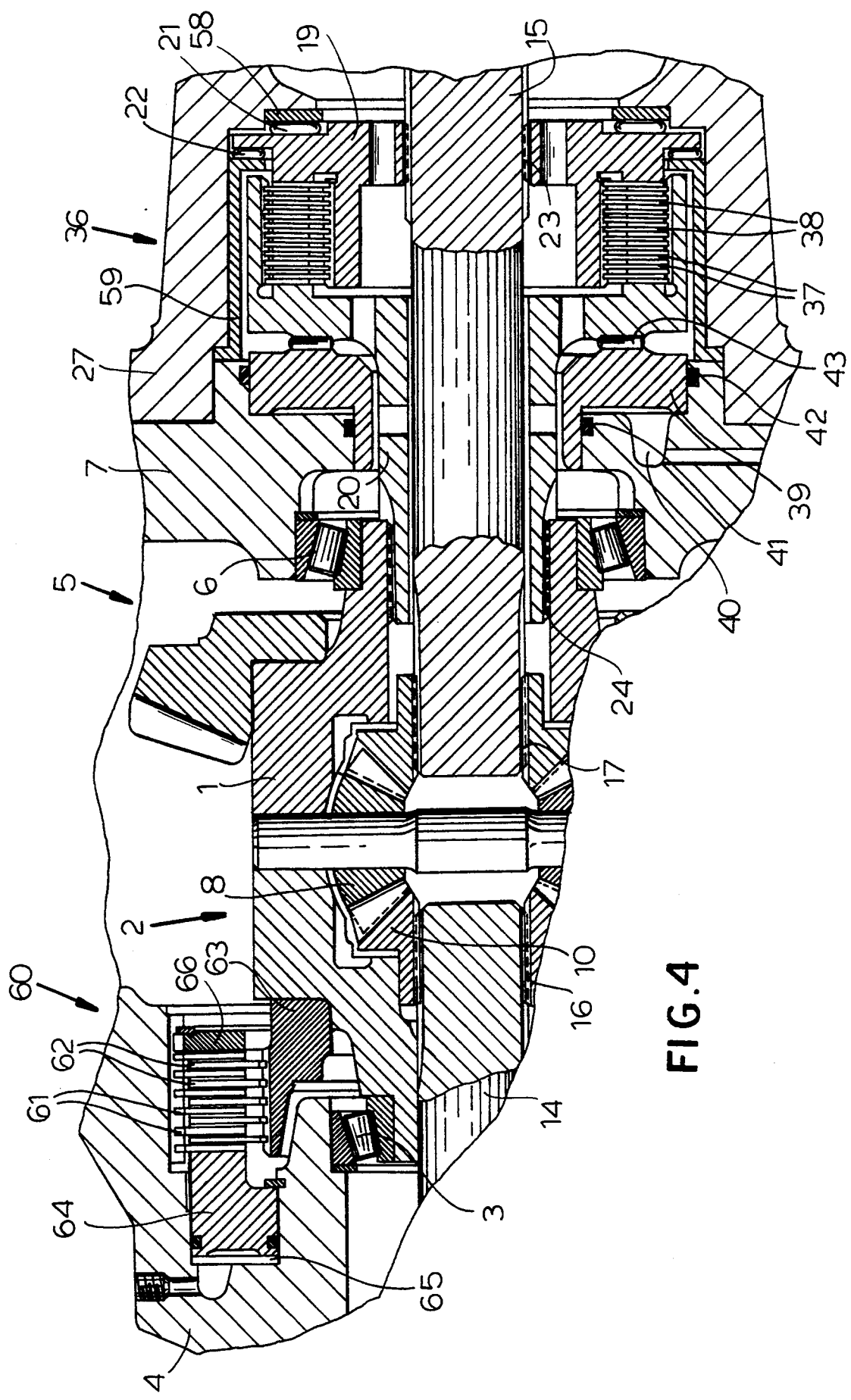

FIG. 1 shows a first differential gear,
FIG. 2 shows a further differential gear,
FIG. 3 shows a differential gear according to claim 4,
FIG. 4 shows a differential gear according to claim 5.

FIG. 1: A planet carrier 1 of a differential gear 2 is supported rotatably and axially stationary in a first bearing 3 in a first main component 4 of a gear housing 5 and in a second bearing 6 in an intermediate ring component 7 of the gear housing 5. The planet carrier 1 carries planetary gears 8 on a planet axle 9. The planet carrier 1 drives a first and center gear 10, 11 over the planetary gears 8.

A first and a second friction clutch 12, 13 automatically connect the planet carrier 1 with the first and second center gears 10, 11.

The first and the second center gear 10, 11 drive a first and a second drive wheel of the vehicle over a first and a second output shaft 14, 15. Engaging gears with axially parallel engaging surfaces 16, 17 corotatably connect the center gears 10, 22 with the axially mobile output shafts 14, 15.

An actuatable jaw clutch 18 with an axially stationary clutch component 19 and an axially mobile clutch component 20 corotatably connect the planet carrier 1 with the second output shaft 15. Axial bearings 21, 22 hold the axially stationary clutch component 19 axially fixed to a second main component 27 of the gear housing 5. Engaging gears with axially parallel engaging surfaces 23 connect the axially stationary clutch component 19 corotatably with the second output shaft 15. The engaging gears with axially parallel engaging surfaces 24 corotatably connect the axially mobile clutch component 20 with the planet carrier 1.

The clutch components 19, 20 together with the engaging gears with axially parallel engaging surfaces 25, 26 form the shiftable jaw clutch 18.

In the gear housing 5, axially between the intermediate ring part 7 and the second main component 27 of the gear housing 5, a magnet coil 28 of an electromagnet 29 is fastened. The axially mobile clutch component 20 forms a magnet armature for the electromagnet 29. An electric current in the magnet coil 28 generates a magnetic flux 30 and thereby an axial magnetic force in a magnet gap 31 between a tapered surface 32 of the axially mobile clutch component 20 and a tapered surface 33 of the intermediate ring part 7 of the gear housing 5 and closes the jaw clutch 18 against a spring 34. The spring 34 and an axial bearing 35 are axially arranged between the two clutch components 19, 20.

FIG. 2: A planet carrier 1 of a differential gear 2 is supported rotatably and axially stationary in a first bearing 3 in a first main component 4 of a gear housing 5 and in a second bearing 6 in an intermediate ring part 7 of the gear housing 5. The planet carrier 1 drives via planetary gears 8 on a planet axle 9 a first and a second center gear 10, 11. Engaging gears with axially parallel engaging surfaces 16, 17 connect the axially stationary center gears 10, 11 with the axially mobile output shafts 14, 15.

A continuously controllable friction clutch 36 with an axially stationary clutch component 19 and an axially mobile clutch component 20 can transmit a continuously controllable friction torque between the axially stationary planet carrier 1 and the axially mobile second output shaft 15.

Axial bearings 21, 22 with bearing races 58, 59 hold the axially stationary clutch component 19 axially fixed with respect to the gear housing 5. Engaging gears with axially parallel engaging surfaces 23 connect the axially stationary clutch component 19 in a corotational manner with the second output shaft 15. Engaging gears with axially parallel engaging surfaces (24) corotatably connect the axially movable clutch component 20 with the planet carrier 1. The friction clutch 36 is a disk clutch with outer disks 37 in an outer disk carrier and inner disks 38 on an inner disk carrier. The axially stationary clutch component 19 forms the inner disk carrier. The axially mobile clutch component 20 forms the outer disk carrier.

The intermediate ring part 7 of the gear housing 5 forms a cylinder for a piston 39 and with the piston 39 a chamber 40. Sealing rings 41, 42 seal radially between the piston 39 and the intermediate ring part 7. Pressure fluid in the chamber 40 pushes the piston 39 via an axial bearing 43 against the axially mobile clutch component 20 and the axially mobile clutch component 20 via the outer disks 37 and the inner disks 38 against the axially stationary clutch component 19, thereby generating a friction torque of the friction clutch 36.

FIG. 3: A differential gear according to FIG. 2 is here completed by two brakes 45, 46.

A first brake 45 transmits a continuously controllable braking torque from the first output shaft 14 to the first main component 4 of the gear housing 5. A second brake 46 transmits a continuously controllable braking torque from the second output shaft 15 to the second main component 27 of the gear housing 5.

Each brake 45, 46 is a disk brake with outer disks 47 in an outer disk carrier 49 and with inner disks 48 on an inner disk carrier 50. Each inner disk carrier 50 is corotatably connected with an output shaft 14, 15, via engaging gears with axially parallel engaging surfaces 57. Each outer disk carrier 49 is fixed in main component 4, 27 of the gear housing 5. Each outer disk carrier 49 forms a cylinder for a piston 51 and with the piston 51 a chamber 52 for pressure fluid. Sealing rings 53, 54 seal radially between the piston 51 and the outer disk carrier 49. Pressure fluid in chamber 52 pushes the piston 51 against an axially mobile first end member 55 and the first end member 55 via outer disks 47 ad inner disks 48 against an axially stationary second end member of the brake 45, 56, thereby generating the braking torque of brake 45, 46.

The bearing flange 44 of the first bearing 3 for the planet carrier 1 forms the second end member of the first brake 45. A thrust ring 56 for the axial bearing 21 for the first clutch component 19 of the friction clutch 36 is fixed in the second main component 27 of the gear housing 5 and forms the second end member of the second brake 46.

FIG. 4: A continuously controllable friction clutch 36 with an axially stationary clutch component 19 and an axially mobile clutch component 20 transmits a continuously controllable friction torque between the axially stationary planet carrier 1 and the axially mobile output shaft 15.

A brake 60 transmits a continuously controllable braking torque from the planet carrier 1 to the first main component 4 of the gear housing 5. The brake 60 is a disk brake with outer disks 61 in an outer disk carrier and inner disks 62 on an inner disk carrier 63. The first main component 4 of the gear housing 5 forms the outer disk carrier. The inner disk carrier 63 is connected with the planet carrier 1 in a fixed but detachable manner. The first main component 4 of the gear housing 5 forms a cylinder for the piston 64 and with the piston 64 a chamber 65. The piston 64 forms an actuating member for the brake 60. Pressure fluid in chamber 65 via the piston 64 pushes together the outer disks 61 and the inner disks 62 against a fixed end member 66 and generates a braking torque of the brake 60.

Besides the four embodiment examples shown in the drawing, within the framework of the invention many more different constructions are possible, wherein the features of claim 1 are combined in a different way with the features defined in the other claims.

For instance, the differential gear 2 shown in FIG. 1 with the jaw clutch 18 can be additionally provided with two brakes 45, 46 as shown in FIG. 3. Or one of the differential gears 2 shown in FIG. 2 or in FIG. 3 can additionally be equipped on the other side of the planet carrier 1 with a second intermediate ring part and with a second friction clutch, connecting the planet carrier 1 with the first output shaft 14 in a corotational manner.

Or the first and second main components 4, 27 form additionally the outer disk carriers 49 for the outer disks 47 and the cylinder for the piston 51 (FIG. 3). Or vice versa, a special component is fastened in the gear housing 5 and forms the outer disk carrier for the outer disks 61 and the cylinder for the piston 64. (FIG. 4).

Pressure fluid for the chambers 40, 52 and 65 for the friction clutch 36 (FIGS. 2 to 4) and the brakes 45, 56 (FIG. 3) and 60 (FIG. 4) can be delivered by any desired source. The pressure fluid can be a liquid or a gas.

| Reference Numerals |
| --- |
| 1 planet carrier |
| 2 differential gear |
| 3 bearing |
| 4 main component |
| 5 gear housing |
| 6 bearing |
| 7 intermediate ring part |
| 8 planetary gear |
| 9 planet axle |
| 10 center gear |
| 11 center gear |
| 12 friction clutch |
| 13 friction clutch |
| 14 output shaft |
| 15 output shaft |
| 16 engaging surface |
| 17 engaging surface |
| 18 jaw clutch, clutch |
| 19 clutch component |
| 20 clutch component |
| 21 axial bearing |
| 22 axial bearing |
| 23 engaging surface |
| 24 engaging surface |
| 25 engaging surface |
| 26 engaging surface |
| 27 main component |
| 28 magnet coil |

-continued

| Reference Numerals |
| --- |
| 29 electromagnet |
| 30 magnet flux |
| 31 magnet gap |
| 32 tapered surface |
| 33 tapered surface |
| 34 spring |
| 35 axial bearing |
| 36 friction clutch, clutch |
| 37 outer disks |
| 38 inner disks |
| 39 piston |
| 40 chamber |
| 41 sealing ring |
| 42 sealing ring |
| 43 axial bearing |
| 44 bearing flange |
| 45 brake |
| 46 brake |
| 47 outer disk |
| 48 inner disk |
| 49 outer disk carrier |
| 50 inner disk carrier |
| 51 piston |
| 52 chamber |
| 53 sealing ring |
| 54 sealing ring |
| 55 end member |
| 56 thrust ring |
| 57 engaging surface |
| 58 bearing race |
| 59 bearing race |
| 60 brake |
| 61 outer disk |
| 62 inner disk |
| 63 inner disk carrier |
| 64 piston |
| 65 chamber |
| 66 end member |

We claim:

1. Differential gear having these features:
   An axially stationary planet carrier (1) drives two center gears (10, 11) over at least one planetary gear (8),
   each center gear (10, 11) drives an axially mobile output shaft (14, 15),
   at least one actuatable clutch (18 or 36) with an axially stationary and an axially mobile component (19, 20) connects the planet carrier (1) with an output shaft (15),
   the stationary clutch component (19) is corotatably connected with the output shaft (15),
   a gear housing (5) has an intermediate ring part (7) between a first and a second main component (4, 27);
   the planet carrier (1) is supported by a first bearing (3) in the first main component (4) and by a second bearing (6) in the intermediate ring part (7),
   the mobile clutch component (20) is corotatably connected with the planet carrier (1), characterized by these features:
   the stationary clutch component (19) is supported by two axial bearings (21, 22) axially fixed with respect to the second main component (27).

2. Differential gear according to claim 1 with the following features:
   The actuatable clutch (36) is a friction clutch;
   the intermediate ring part (7) forms a cylinder for a piston (39) and with the piston (39) a chamber (40);
   pressure fluid in the chamber (40) produces a friction torque of the clutch (36).

3. Differential gear according to claim 2 with the following features:
   The clutch (36) is a disk clutch with outer disks (37) in an outer disk carrier and inner disks (38) on an inner disk carrier;
   the mobile clutch component (20) forms the outer disk carrier;
   the stationary clutch component (19) forms the inner disk carrier.

4. Differential gear according to claim 1 having the following features:
   A first brake (45) connects a first output shaft (14) with the first main component (4);
   a second brake (46) connects the second output shaft (15) with the second main component (27).

5. Differential gear according to claim 2 having the following features:
   a brake (60) connects the planet carrier (1) with the first main component (4);
   a logical circuit controls the friction coupling (36) when the brake is actuated.

* * * * *